United States Patent [19]

Willey et al.

[11] Patent Number: 5,787,348
[45] Date of Patent: Jul. 28, 1998

[54] METHOD OF MEASURING SPEED OF A MOBILE UNIT AND A RECEIVER FOR USE IN A WIRELESS COMMUNICATION SYSTEM

[75] Inventors: William Daniel Willey, Arlington Heights, Ill.; Michael Joseph Wroble, Bedford, Tex.; John Christopher Kay, Elgin, Ill.

[73] Assignee: Motorola, Inc., Schaumburg, Ill.

[21] Appl. No.: 569,413

[22] Filed: Dec. 6, 1995

[51] Int. Cl.$^6$ .................................................. H04Q 7/38
[52] U.S. Cl. ...................... 455/441; 455/438; 455/439; 455/444; 342/104; 342/105; 370/332
[58] Field of Search .................... 455/33.1, 33.2, 455/33.4, 52.1, 52.3, 54.1, 56.1, 438, 439, 440, 441, 444, 504, 506; 379/59, 60; 370/331, 332; 342/104, 105, 115

[56] References Cited

U.S. PATENT DOCUMENTS

| | | | |
|---|---|---|---|
| 4,556,760 | 12/1985 | Goldman | 379/60 |
| 4,694,484 | 9/1987 | Atkinson et al. | 379/59 |
| 5,036,532 | 7/1991 | Metroka et al. | 379/58 |
| 5,239,667 | 8/1993 | Kanai | 455/10 |
| 5,367,559 | 11/1994 | Kay et al. | 379/60 |
| 5,392,453 | 2/1995 | Gudmundson et al. | 455/444 |
| 5,396,253 | 3/1995 | Chia | 342/104 |
| 5,396,645 | 3/1995 | Huff | 455/33.4 |
| 5,436,956 | 7/1995 | Shiotsuki et al. | 455/441 |
| 5,585,805 | 12/1996 | Takenaka et al. | 342/461 |

Primary Examiner—Nguyen Vo
Assistant Examiner—Lee Nguyen
Attorney, Agent, or Firm—Heather L. Creps

[57] ABSTRACT

A method of measuring speed of a mobile unit for use in a wireless communication system 20. The method includes the steps of receiving a radio frequency (RF) signal from the mobile unit 202, measuring signal quality of the RF signal to produce a received quality signal 204, sampling the received quality signal during a first time period to produce a first group of samples 206, sampling the received quality signal during a second time period to produce a second group of samples 208, calculating a variation in signal quality of the RF signal in response to the first and second group of samples 210, and determining a speed measurement in response to the variation in signal quality 212.

16 Claims, 14 Drawing Sheets

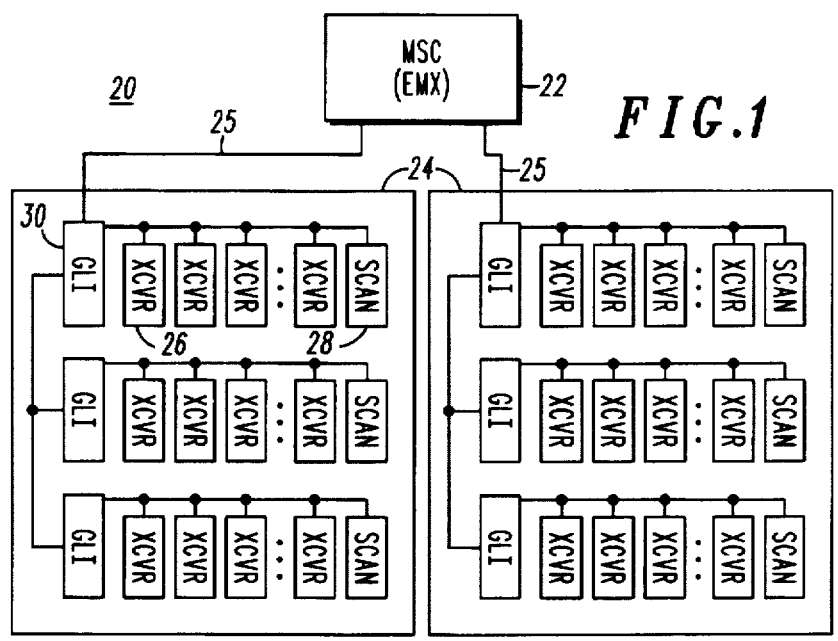
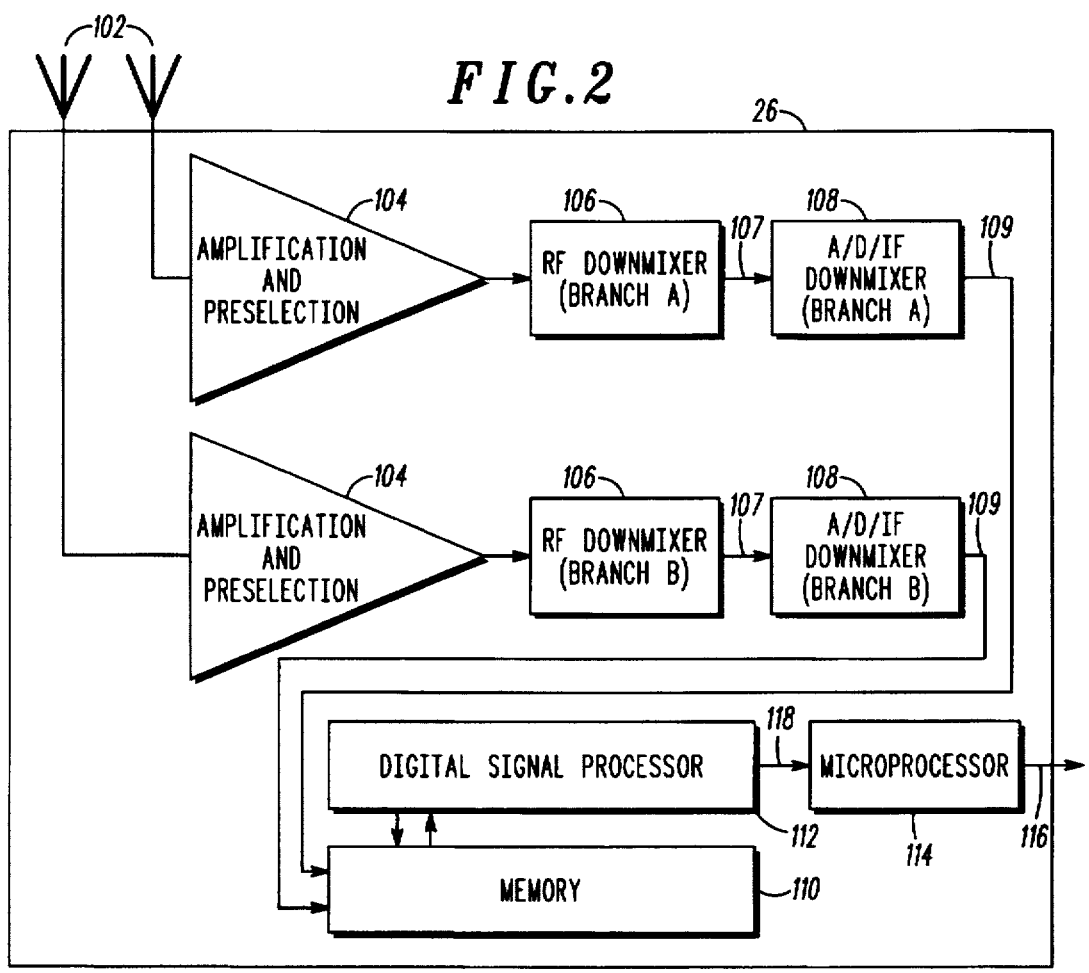

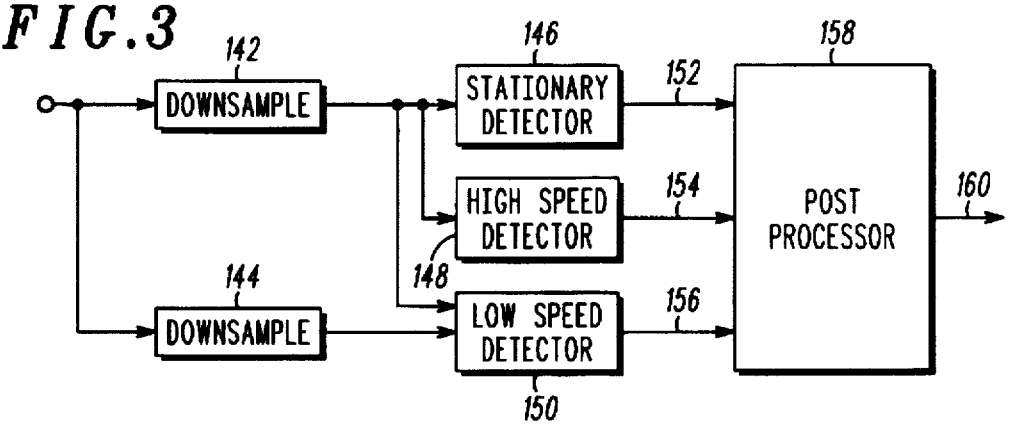
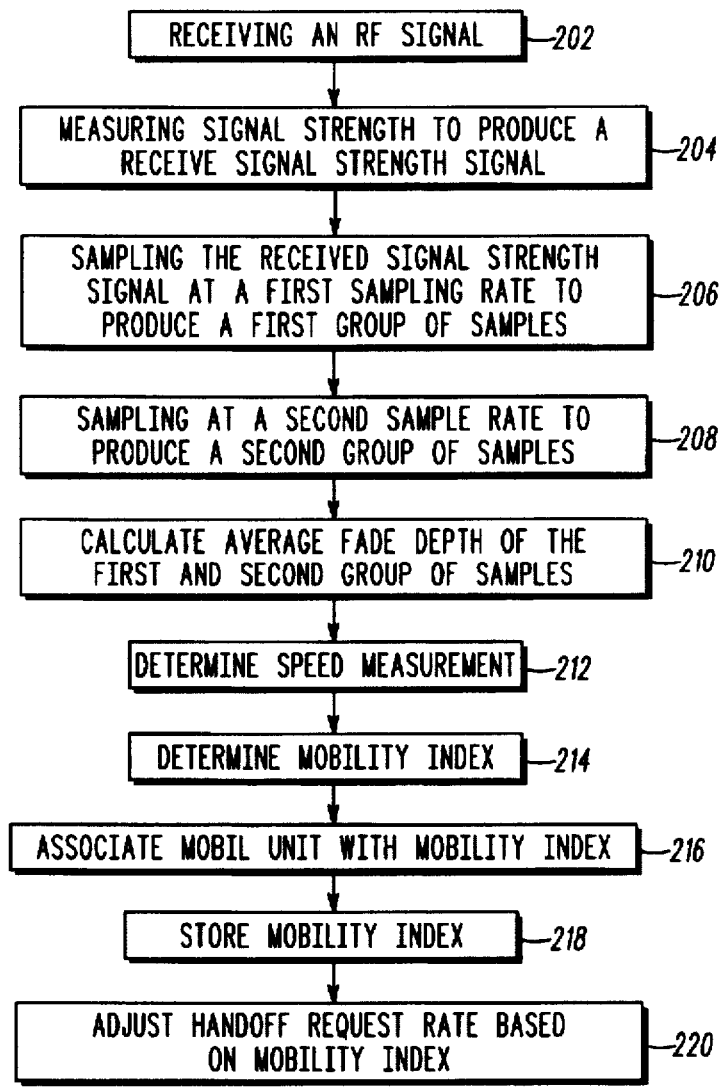

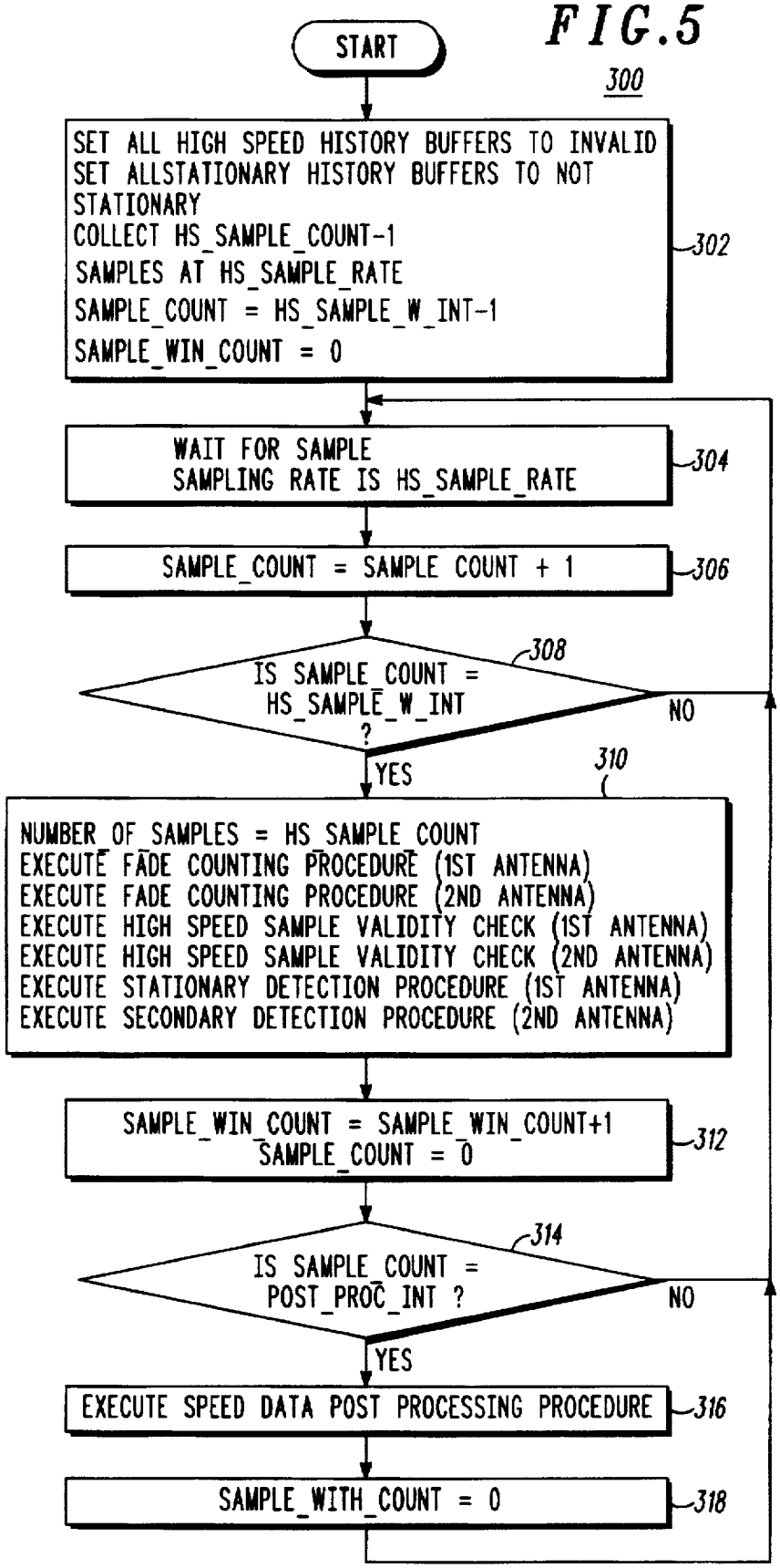

330

METHOD OF MEASURING SPEED OF A MOBILE UNIT AND A RECEIVER FOR USE IN A WIRELESS COMMUNICATION SYSTEM

FIELD OF THE INVENTION

This invention relates generally to wireless communication systems, and more particularly measuring speed of a mobile unit in communication with a receiver in a wireless communication.

BACKGROUND OF THE INVENTION

Conventional cellular telephone systems have been designed primarily to serve mobile subscribers in vehicles. In these systems, call processing parameters are generally set up to handle a worst case scenario of the mobile subscriber moving at a high rate of speed. In the worst case scenario, calls need to be handed off from cell to cell quickly before the call is dropped.

Because subscriber equipment has become increasingly portable, a greater percentage of subscribers now place calls while stationary (e.g. in a building) or moving at a pedestrian speed (e.g. while walking). These calls do not require as many call processing resources as calls made by faster moving subscribers such as those in vehicles. However, to avoid dropped calls, current cellular telephone systems typically perform call processing as if all subscribers are fast moving subscribers. As a result, scarce call processing resources are not managed in an efficient manner, leading to reduced system performance.

Accordingly, there is a need for a more efficient wireless communication system that is adaptable to variable subscriber speeds.

SUMMARY OF THE INVENTION

In order to address this need, the present invention provides a method and apparatus for measuring speed of a mobile unit in communication with a wireless communication system. The method includes the steps of receiving a radio frequency (RF) signal from the mobile unit, measuring signal quality of the RF signal to produce a received quality signal, sampling the received quality signal during a first time period to produce a first group of samples, sampling the received quality signal during a second time period to produce a second group of samples, calculating a variation in signal quality of the RF signal in response to the first and second group of samples, and determining a speed measurement in response to the variation in signal quality.

According to one aspect of the present invention, the apparatus is a receiver in a wireless communication system. The receiver includes an antenna receiving a radio frequency signal, a radio frequency stage receiving the radio frequency signal and producing a measured quality signal, and a processor responsive to the radio frequency stage. The processor includes a memory having a speed measurement routine. The processor, when executing the speed measurement routine, samples the measured quality signal at a first sampling rate to produce a first group of samples, samples the measured quality signal at a second sampling rate to produce a second group of samples, calculates an average fade depth of the first and second group of samples, and determines a speed measurement based on the average fade depth of the first and second group of samples.

According to another aspect of the present invention, the receiver described above is incorporated into a base station in a wireless communication system. The wireless communication system also includes a switching device responsive to the base station. The switching device includes a handoff controller responsive to the processor in the receiver. The handoff controller initiates handoff based on the speed measurement determined by the processor.

The wireless communications system also contains base stations intended on serving small geographic areas called microcells and base stations covering serving geographic areas called macrocells. The microcells and macrocells may be serving the same geographic area.

The invention itself, together with its intended advantages will best be understood by reference to the following detailed description, taken in conjunction with the accompanying drawings.

BRIEF DESCRIPTION OF THE DRAWINGS

FIG. 1 is a block diagram of a preferred embodiment of a wireless communication system.

FIG. 2 is a block diagram of the transceiver of FIG. 1.

FIG. 3 is a block diagram of illustrating data flow of a method of determining a mobility state in the signal processor in the transceiver of FIG. 2.

FIGS. 4–13 are flow charts illustrating a preferred embodiment of a method of control within the controller of FIG. 3.

DETAILED DESCRIPTION OF THE PREFERRED EMBODIMENTS

Figure 6:
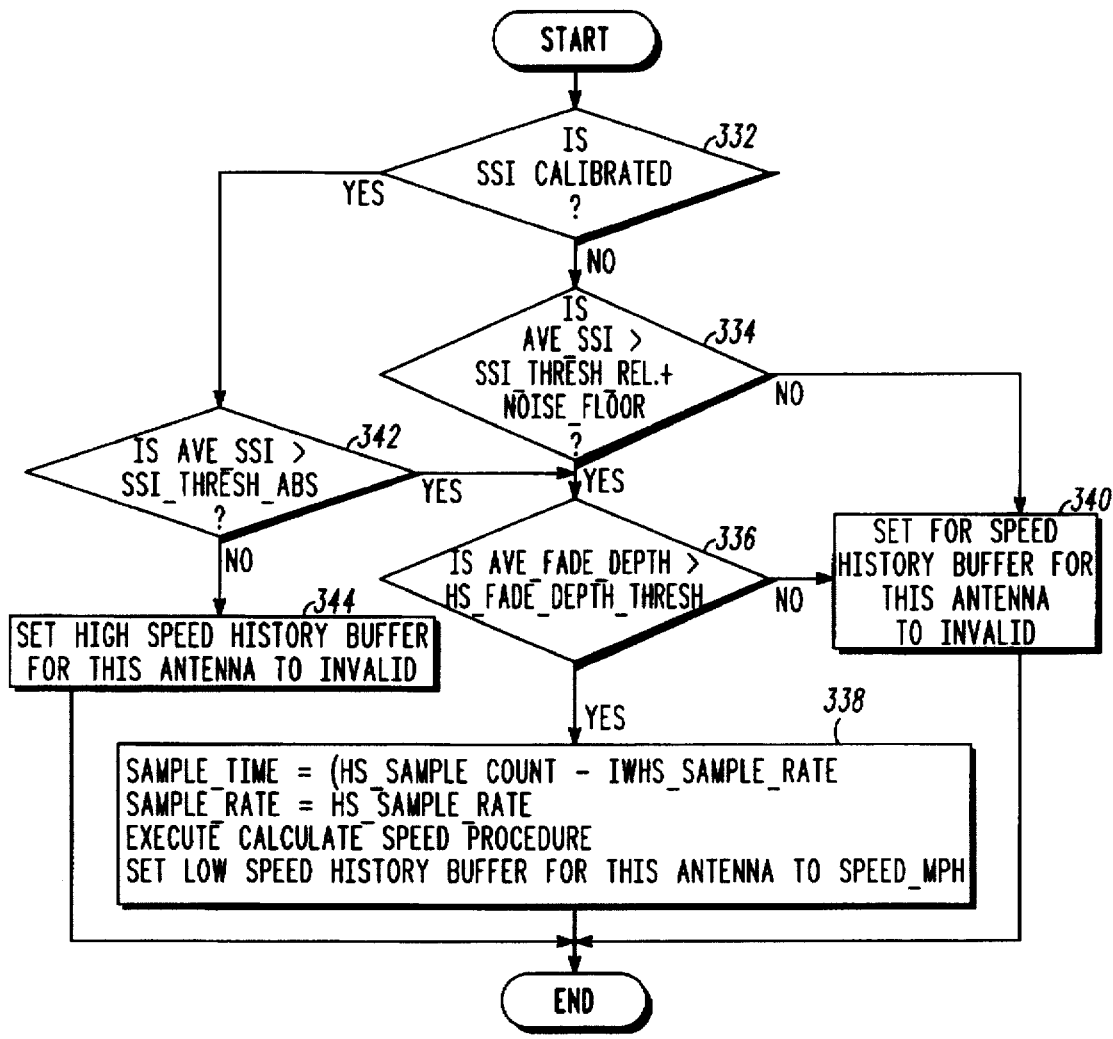

Referring to FIG. 1, a cellular communication system 20 is illustrated. The cellular communication system 20 includes a mobile switching center (MSC) 22 and a plurality of base transceiver stations (BTS) 24 connected to the mobile switching center 22 via span lines 25. Each of the base transceivers stations 24 include a plurality of transceivers (XCVR) 26, scan receivers (SCAN) 28 and interface circuits (GLI) 30. In the particular embodiment of FIG. 1, the mobile switching center 22 is a switch, such as a Motorola EMX2500™. The base transceiver stations 24 may be a suitable base station such as a Motorola SC 9600™ base station.

Referring to FIG. 2, a more detailed diagram of the base transceiver 26 is shown. The transceiver 26 is connected to a plurality of antennas 102, and includes a plurality of amplification and preselection circuits 104, and a plurality of downmixers 106 and 108. The amplifiers 104 and downmixers 106 and 108 comprise a conventional RF stage. The transceiver 26 also includes a controller having a first processor 112, a postprocessor 114, and a memory 110. The first processor 112 is coupled to the memory 110 and the postprocessor 114. The postprocessor 114 receives a mobility state signal 118 from the first processor 112 and outputs a signal 116 which is linked to GLI 30.

In the transceiver 26, an RF signal is received at the antenna 102 and is amplified and downconverted by the RF stage including the amplifier 104, the downmixer 106 and the intermediate frequency (IF) downmixer 108, receiving an IF signal 107 from downmixer 106. The RF stage then provides a complex baseband signal sent over a data bus 109, such as a direct memory access bus having in phase (I) and quadrature (Q) components as well as automatic gain control (AGC) values. The I, Q and AGC values are then stored in the memory 110. The processor 112, which is preferably a digital signal processor, calculates a power measurement based on the I and Q values, preferably $I^2+Q^2$. The processor 112 converts the calculated power measurement and the AGC value to a decibel measurement. The processor 112 then calculates a mobility state based on the power measurements as well as synchronization data such as a supervisory audio tone (SAT) or a digital supervisory audio tone (DSAT). The mobility state is then sent to the postprocessor 114 via the communication link 118. Postprocessor 114 uses the calculated mobility state 118 for call processing decisions such as handoff requests between cell sites. The mobility state 118 is preferably an index value which is indicative of how fast the mobile unit sending the RF signal that is received at antenna 102 is traveling. In the preferred embodiment, the mobility state may also have a value indicating that the speed of the mobile unit could not be determined.

Referring to FIG. 2, an alternate hardware configuration may be used. In the alternate configuration, an additional DSP with additional SRAM is used. In the alternative configuration, the complex baseband signal I, Q, and A.G.C. (dB gain value) is sent from the A/D/IF downmixer to the SRAM associated with the additional DSP via DMA. The additional DSP then computes power $I^2+Q^2$ (without A.G.C.). The additional DSP also derives an audio signal. The A.G.C., the $I^2+Q^2$, and the audio signal is passed from the SRAM associated with the additional DSP to the SRAM associated with the DSP responsible for speed detection via DMA. The DSP responsible for speed measurement then converts the power + A.G.C. value to dBm and derives SAT, DSAT, and wideband data from the audio signal which are used to measure speed.

Referring to FIG. 2, a second alternate hardware configuration may be used. In the alternate configuration a 68302 microprocessor is used to measure speed. Circuitry external to the 68302 is used to derive SAT, wideband data, and narrowband sub-audible data; SAT detect status, wideband data, and sub-audible data is available to the 68302 via reads of its memory map. A analog dBm RSSI signal is derived from external circuitry. The analog RSSI signal is converted to a digital value by an A/D converter and transferred to memory in the 68302's memory map via DMA.

Referring to FIG. 3, a particular embodiment of the data flow of a method of determining mobility state in the processor 112 within the transceiver 26 is shown. The data flow includes a first down sample block 142, a second down sample block 144, a stationary detector 146, a high speed detector 148 and a low speed detector 150. The data flow 140 also includes a routine 158. The first down sample block 142 and the second down sample block 144 each receive signal strength indicator samples at a high sample rate. The signal strength samples are derived from power measurements of the values stored within the memory 110. For example the signal strength samples may be related to the power measurements of the received signal from antenna 102. The first down sample block 142 produces a high speed sampled signal which is fed into the stationary detector 146, the high speed detector 148 and the low speed detector 150. The second down sample block 144 has a slower sample speed than the first down sample block and produces low speed samples.

In the particular embodiment of FIG. 3, the low speed samples are only fed to the low speed detector 150. The stationary detector 146 receives the high speed samples from the first down sample block 142 and produces a stationary history buffer 152 which is sent to routine 158. The detector 146 evaluates the high speed samples to determine whether the mobile unit in communication with the base station 24 is in a stationary state. The high speed detector 148 also receives the high speed samples from down sample block 142 and produces a high speed history buffer 154 which is sent to routine 158. The high speed detector 148 evaluates the high speed samples to determine whether the mobile unit is traveling at a high rate of speed. The low speed detector receives the low speed samples from the second down sample block 144 and also receives high speed samples from the first down sample block 142 and produces a low speed history buffer 156 that is also fed into routine 158. The routine 158 responds to the input from the stationary detector 146, the high speed detector 148 and the low speed detector 150 and produces a mobility state 160.

A preferred method of receiving a RF signal and producing a mobility state is illustrated in FIG. 4. The method begins at 201 by receiving an RF signal at step 202. The RF signal may be received at the antenna 102. Next, at 204, signal strength of the RF signal is measured to produce a received signal strength signal. The received signal strength signal is sampled at a first sampling rate to produce a first group of samples at step 206. The first group of samples may be the high speed samples produced by the first down sample block 142. Next, at step 208, a second sample rate is used to produce a second group of samples such as the low speed samples from the second down sample block 144. Next at 210, the DSP 112 calculates an average fade depth of the first and second group of samples and determines a speed measurement, at 212. The mobility index is determined based on the speed measurement, at 214. The mobile unit associated with the received signal is then associated with the calculated mobility index at step 216. The mobility index is stored, at step 218, and finally a handoff request rate is adjusted based on the mobility index at 220.

Referring to FIG. 5, a preferred method of sampling the received signal strengths at a first sampling rate to produce a first group of samples as described at step 206 of FIG. 4, is shown in more detail. A processor initializes a set of variables, at 302, and waits for samples and sets a constant high speed sample rate, at 304. The sample count is then incremented at step 306 and is compared to a sample interval decision block, at 308. If the sample count is equal to the threshold then processing continues at step 310 where the number of samples is set equal to the sample count. A fade counting procedure is performed for a first and second antenna. A high speed validity check is performed for a first and second antenna and a stationary detection procedure is performed for a first and second antenna. Next, at 312, a sample_win_count variable is incremented and a sample count variable is initialized to zero. Next, at 314, if the sample_win_count is equal to a postprocessing interval, then a postprocessing procedure is executed at 316 and the sample_win_count is set to zero at 318. Otherwise, processing continues back at 304.

A particular embodiment of a method performing high speed sample validity check, as in step 310 of FIG. 5, is illustrated in FIG. 6. As shown in FIG. 6, the high speed sample validity check process 330 includes checking whether the SSI used by the transceiver 26 is calibrated at decision block 332, and comparing an average signal strength indicator value to a signal strength indicator threshold taking into account a noise floor, at decision step 334. If the average signal strength indicator exceeds the threshold then a comparison is made at 336 to determine if the average fade depth exceeds a fade depth threshold. If either of the decision steps of 334 or 336 are negative then a high speed history buffer is set to invalid at step 340 and processing ends. Otherwise, processing continues at block 338 where a sample time and a sample rate are set, a procedure for calculating speed is initiated, and a high speed history buffer for the antenna is set. In addition, depending on whether the SSI is calibrated, the average signal strength may be compared to an alternative threshold at step 342. In this case, if the average signal strength exceeds the second threshold of 342, then the history buffer is set to invalid at 344.

Figure 7:
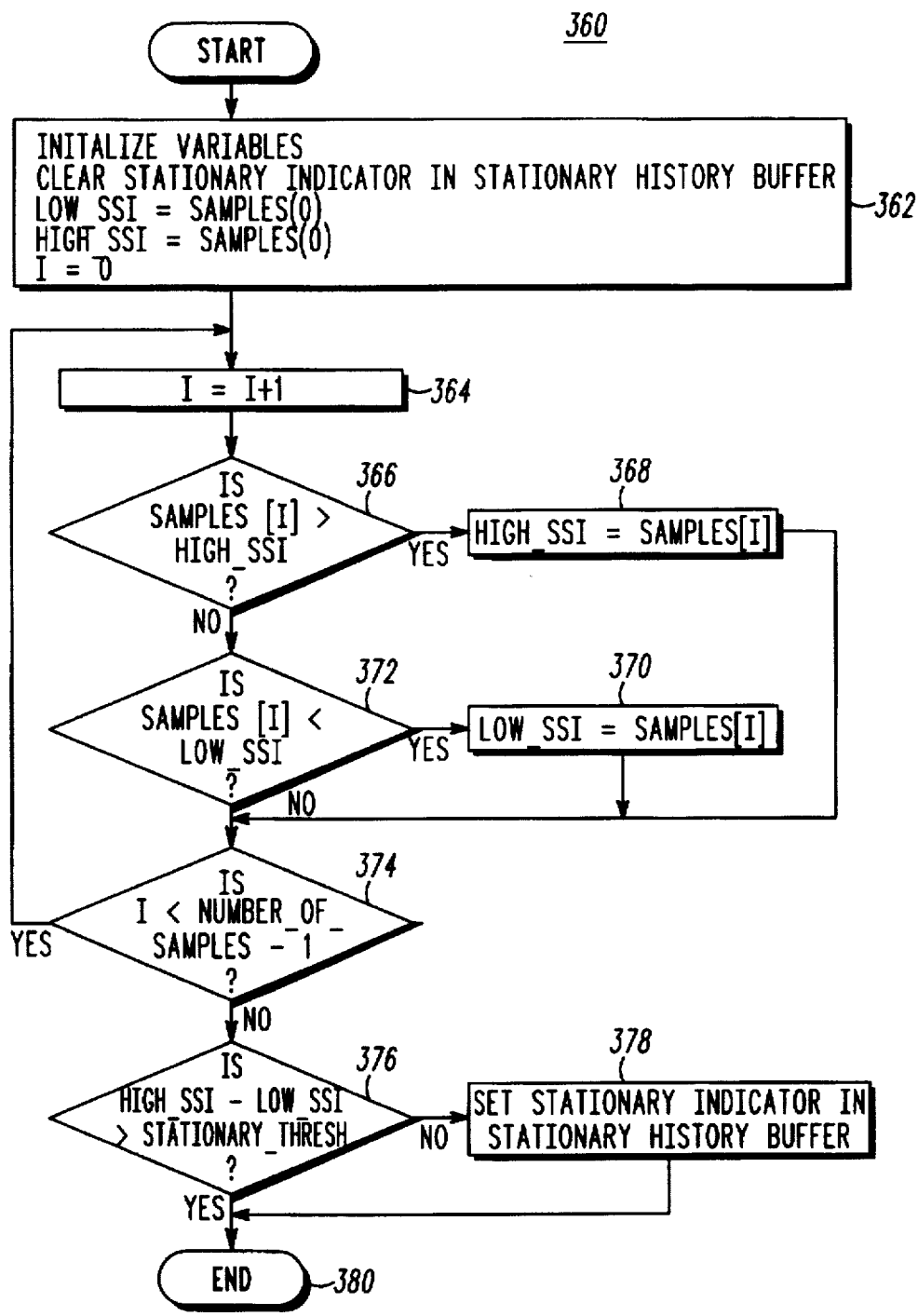

Referring to FIG. 7, a preferred method of performing stationary detection is illustrated. First, variables for stationary detection are initialized at 362, and a counter is incremented at 364. Sample values are compared to a first variable, at 366, and if the sample values exceed the current value of the variable then the variable is updated with the higher value, at 368. Likewise, the sample values are compared to a second variable, at 372, and if the samples are less then the second variable the second variable is updated at 370. Next, at 374, the counter is compared to the number of samples in the set and processing is continued for any remaining samples at step 364.

However, if the group of samples is completed, then a comparison is made between the difference of highest SSI in the samples and the lowest SSI in the samples, at 376. If the difference between the highest and lowest SSI exceeds the stationary threshold then processing ends at 380. However if the test at 376 is negative, a stationary indicator is set in stationary history buffer, at 378.

Figure 8:
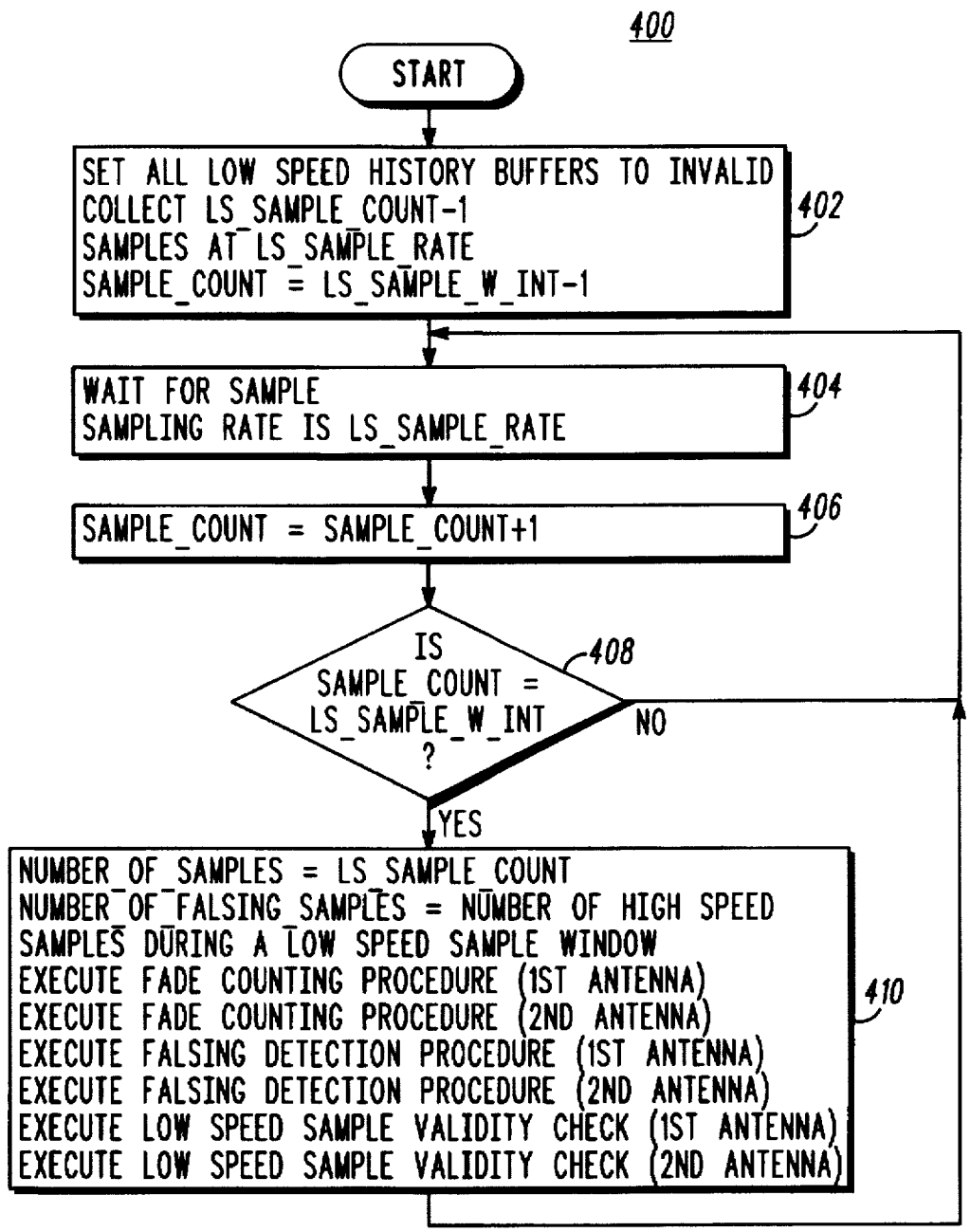

Referring to FIG. 8, a preferred embodiment of a method for performing low speed sample collection is illustrated. The low speed sample collection method begins at 402 where variables for processing are initialized. Processing continues at 404 where the process waits for samples and sets the sampling rate to be the low speed sampling rate. A sample count is incremented at 406 for each received sample and the sample count is compared to a sample interval at 408. If the sample count equals the interval then processing continues at 410 where the number of samples is set equal to the low speed sample count. Further, the number of falsing samples is set equal to a number of high speed samples during a low speed window, a fade counting procedure for first and second antennas is performed, and falsing detection procedures for first and second antennas are performed, and a low speed sample validity check for the first and second antennas is performed.

Figure 9:
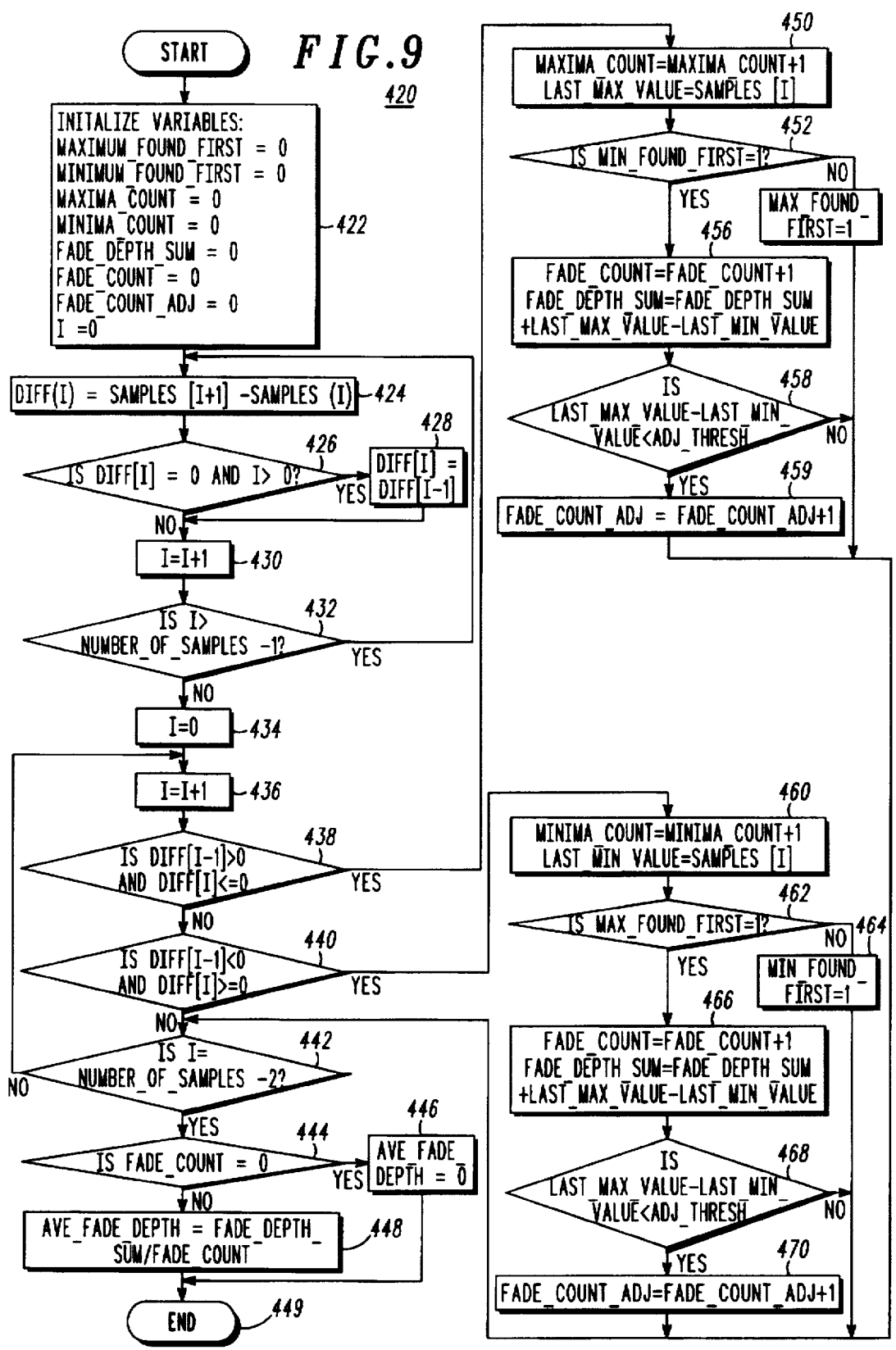

Referring to FIG. 9, a fade counting procedure 420 is illustrated. Variables are initialized at 422. At 424, the first entry of an array of differences between successive SSI samples in a difference array of samples is assigned to the difference between the second SSI sample and the first SSI sample. At decision step 426, the last calculated difference is compared to zero and an index is compared to zero. If the comparison at 426 is positive, then processing continues at 428 where the previous difference from the difference array is copied to the currently indexed difference array entry. As a result, a flat part of the SSI curve will preferably avoid being incorrectly interpreted as a maximum or a minimum. After processing at 428 is complete, or if the comparison at 426 is negative, then processing resumes at 430 where the index is incremented. Next, at 432, the index is compared to the number of samples in the set and processing is continued for any remaining samples at 424.

However, if the group of samples is completed, then the sample index is reinitialized to zero, at 434. Processing continues at 436 where the index is incremented. At decision step 438, the difference array is checked to see if there was a change from the previous entry to the currently indexed entry from greater than zero to less than or equal to zero. If decision step 438 is positive, then a local maximum has been found and processing continues at step 450. If decision step 438 is negative then processing continues at decision step 440 where the difference array is checked to see if there was a change from the previous entry to the currently indexed entry from less than zero to greater than or equal to zero. If decision step 440 is positive, then a local minimum has been found and processing continues at step 460. If decision step 440 is negative then processing continues at step 442 where the index is compared to the number of samples in the set and processing is continued for any remaining samples, at 436.

However, if the group of samples is completed, then the number of counted fades is compared to zero at decision step 444. If decision step 444 is positive then the average fade depth is set to zero and processing ends at 449. If decision step 444 is negative then the average fade depth for the samples in the current sample window is calculated at 448 by dividing the sum of the depths of the counted fades by the number of counted fades. Processing then ends at 449.

Returning to step 450 where a local maximum has just been found, the count of the number of maxima is incremented and the SSI value of the current maximum is saved in memory for later use. Processing continues at decision step 452 where a variable is checked to see if a minimum was found first in the samples before a maximum. If decision step 452 is negative, then processing continues at 454 where a variable is set to indicate that a maximum was found first in the samples before a minimum. Processing then continues at decision step 442. If decision step 452 is positive, then processing continues at 456 where the count of the number of fades is incremented and the sum of the depths of the fades in the sample window is increased by the difference between the last maximum SSI and the last minimum SSI. Processing then continues at decision step 458 where a check is made to see if the difference between the last maximum SSI and the last minimum SSI is lower than an adjustment threshold. If decision step 458 is negative, then processing continues at decision step 442. If decision step 458 is positive, then a fade count adjustment counter is incremented at step 459, then processing continues at decisions step 442.

Returning to step 460 where a local minimum has just been found, the count of the number of minima is incremented and the SSI value of the current minimum is saved for later use. Processing continues at decision step 462 where a variable is checked to see if a maximum was found first in the samples before a minimum. If decision step 462 is negative, then processing continues at 464 where a variable is set to indicate that a minimum was found first in the samples before a maximum. Processing then continues at decision step 442. If decision step 462 is positive, then processing continues at 466 where the count of the number of fades in incremented and the sum of the depths of the fades in the sample window is increased by the difference between the last maximum SSI and the last minimum SSI. Processing then continues at decision step 468 where a check is made to see if the difference between the last maximum SSI and the last minimum SSI is lower than an adjustment threshold. If decision step 468 is positive, then a fade count adjustment counter is incremented at step 470, and processing continues at decision step 442.

Figure 10:
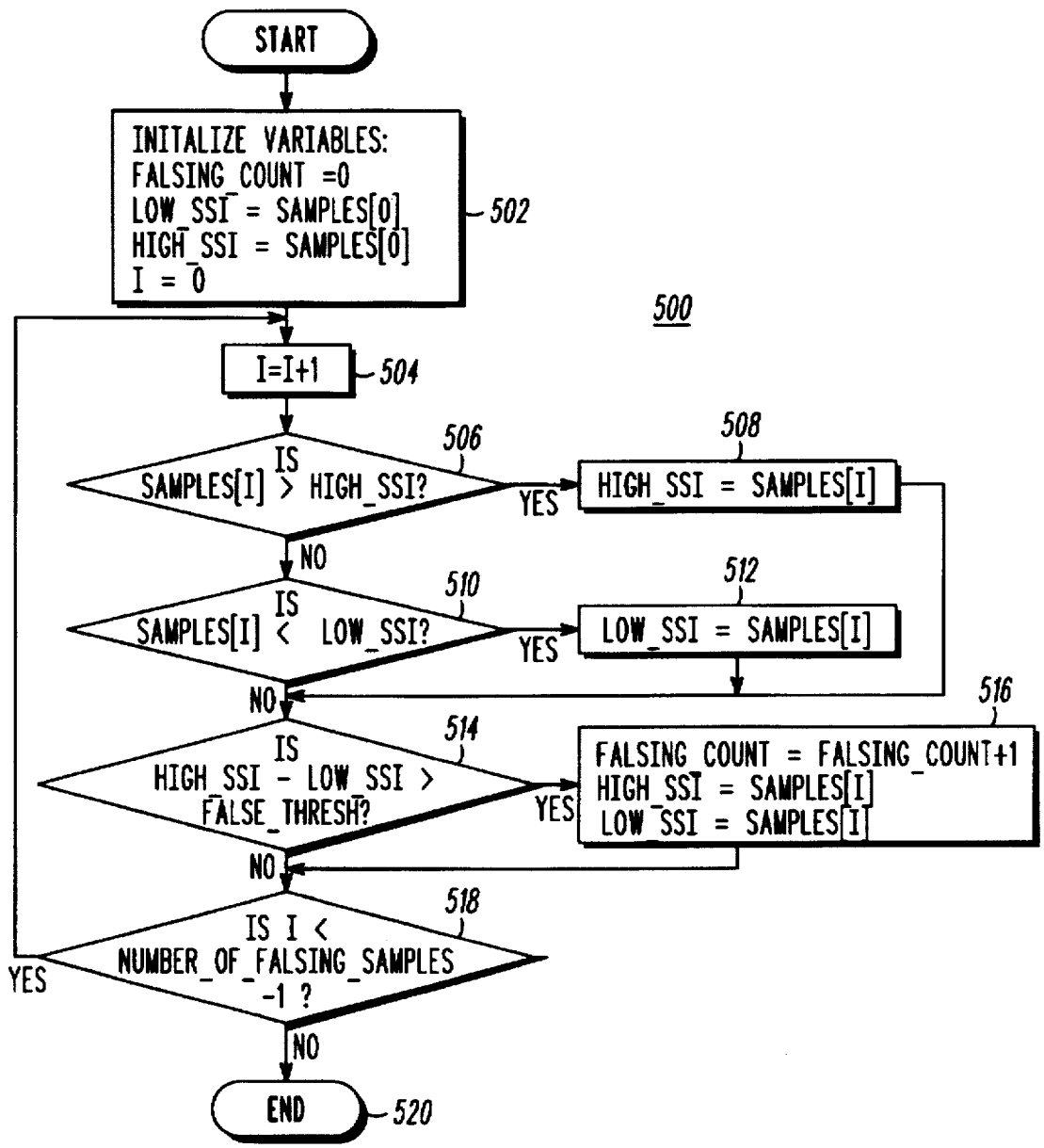

A preferred method of performing falsing detection is shown in FIG. 10. Variables are initialized at 502 and a counter is incremented at 504. Next, a sample is compared to the highest SSI samples since 502 or 516 was executed at 506 and stored if it exceeded the previous high, at 508. Likewise, a sample is compared to the lowest SSI, at 510, and stored as the new lowest sample if the sample is less then the previous threshold, at block 512. Processing continues at decision step 514 where the difference between the highest SSI and the lowest SSI is compared to a falsing threshold. If decision step 514 is positive a falsing count is incremented and falsing is taken into account. At 516 the high and low tracking variables are reset to the current SSI. Finally, a comparison is made between the counter and the number of falsing samples at 518 and processing is either continued at 504 or completed at 520 depending on the result of the comparison.

Figure 11:
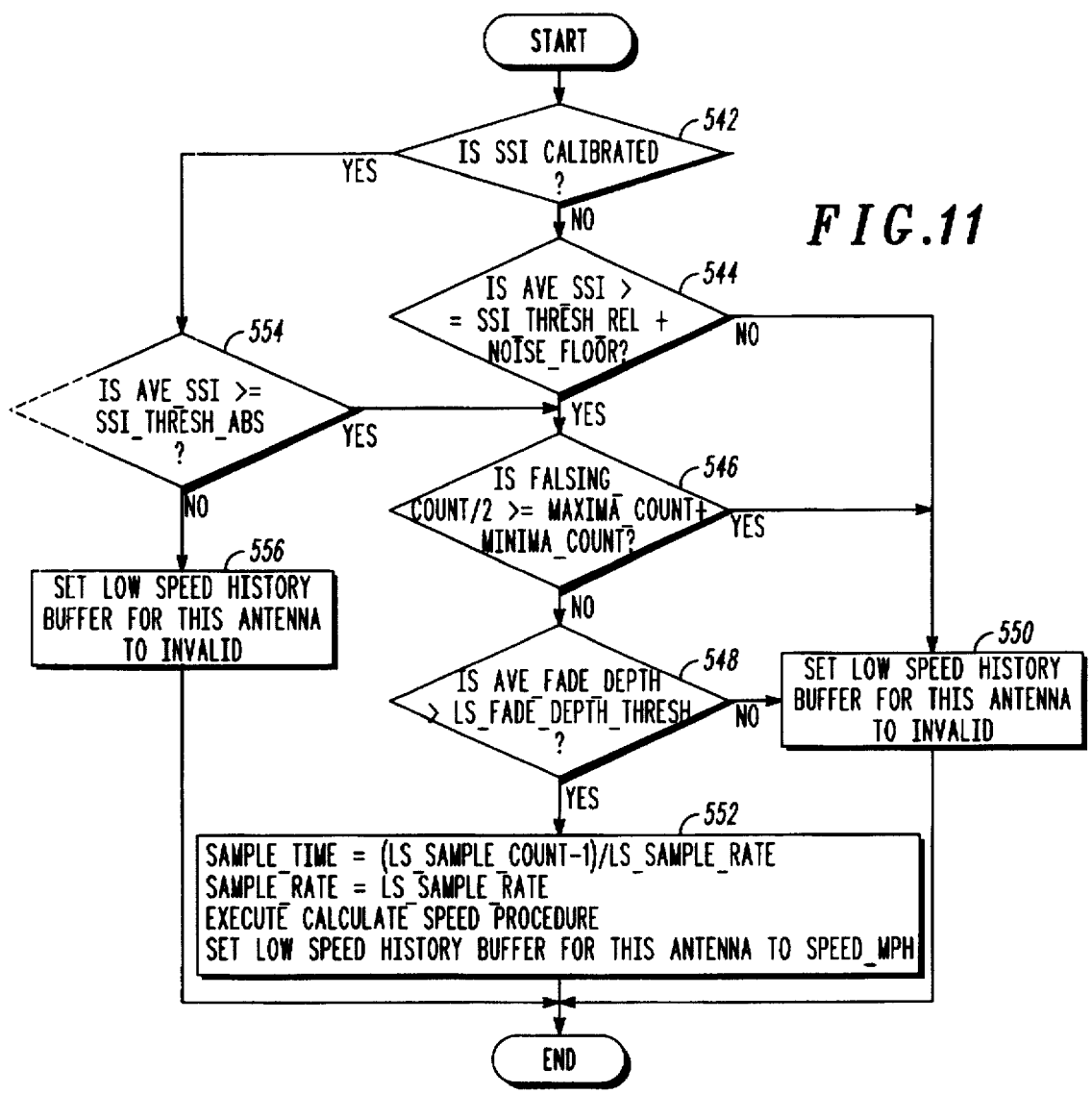

Referring now to FIG. 11, a low speed sample validity check procedure 540 is illustrated. First, a comparison of the whether the SSI is calibrated is made at decision step 542. In a first case, processing continues at decision step 554 where an average signal strength indicator (SSI) value is compared to an absolute SSI threshold. If the comparison at 554 is negative then a low speed history buffer for the antenna is set to invalid at step 556 and processing is ended. However, if the comparison at step 554 is positive then processing continues at decision step 546.

Figure 12:
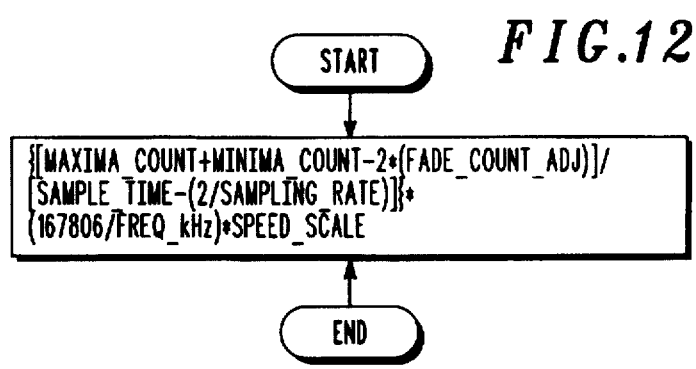

The method 540 also includes processing step 544 which compares the average signal strength to a relative signal strength threshold including a noise floor at decision step 544. If the comparison is negative then the low speed history buffer is set to invalid. However, if the comparison is positive then processing continues to proceed to decision step 546. At step 546, a comparison is made between a falsing count divided by two against a combination of a maximum count and a minimum count. If the comparison at 546 is positive then the low speed history buffer is set to invalid for this particular antenna at 550. However, if the comparison of decision step 546 is negative then an average fade depth is compared to a low speed fade depth threshold at step 548. If the average fade depth exceeds the threshold then processing at 552 is performed. Such processing includes setting a sample time, setting a sample rate, executing a speed calculation procedure and setting a low speed history buffer for the antenna to the speed based on the calculation. If the average fade depth does not exceed the low speed fade depth threshold at 548 then the low speed history buffer is set to invalid at step 550. A particular method of performing the speed calculation of step 552 is illustrated in FIG. 12.

Figure 13A:
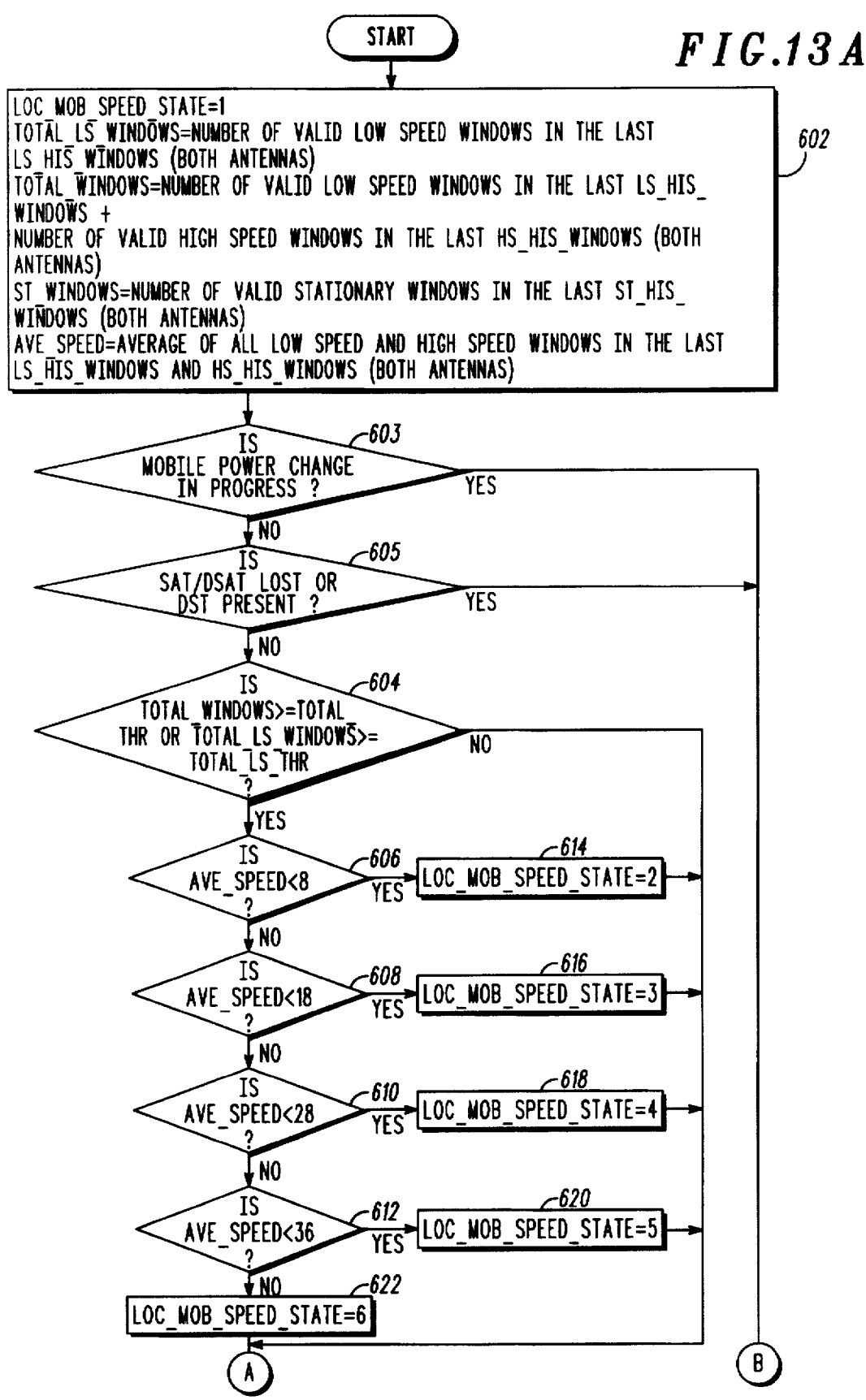
Figure 13B:
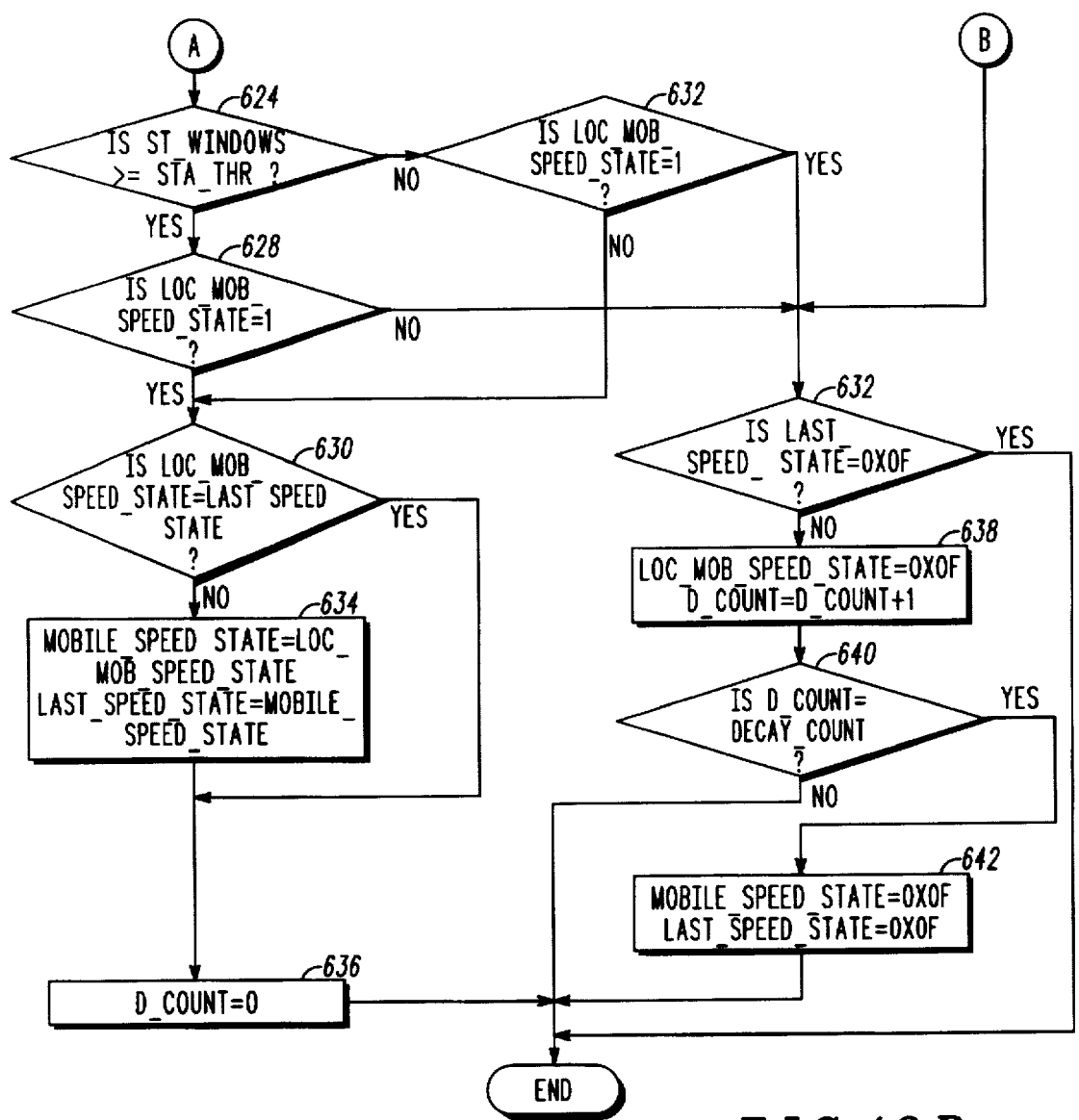

Referring to FIG. 13, a preferred method of determining a speed mobility state is illustrated. A plurality of variables are initialized at step 602, and a check is made at decision step 603 to determine if a mobile state power change is in progress. If a mobile power change is in progress, then the current mobility state is considered indeterminate and processing continues at 632. If a power change is not in progress, then a check is made at decision step 605 to determine if SAT/DSAT has been lost or DST is present. If the result of the comparison is positive, then the current mobility state is considered indeterminate and processing continues at 632. If the result of the comparison is negative, then a total window variable is compared to a total threshold or a low speed window variable is compared to a low speed threshold at decision step 604. If the comparison at 604 is positive then a plurality of comparisons 606, 608, 610, and 612, are made between the measured average speed and a plurality of mobility speed category values at decision steps 606, 608, 610, and 612. Depending on the comparisons a mobility speed state is assigned at 614, 616, 618, 620 or 622. Next, at decision step 624, if the number of valid stationary windows is greater than a stationary threshold then the local mobility speed state is compared to one, at 628, and compared to the last speed state, at 630. If the mobile speed state is equal to the last speed state then processing continues at 636 where a decay count variable is zeroed and processing is completed.

However, if the local mobile speed state is not equal to the last speed state, then the mobile speed state is set equal to the local mobile speed state and the last speed state is set equal to the mobile speed state, at 634. Returning to decision step 628, if the local mobile speed state is not equal to one then the last speed state is compared to a special index symbol, such as Hex F, at decision step 632, and if such decision is affirmative then processing is ended. However, if the last speed state is not equal to the special index symbol then the local mobile speed state is set equal to the special index and the decay count is incremented at 638. The special symbol of hexadecimal (F) is used to define an interdeterminate state in this particular embodiment. Next, at decision step 640, the decay count is compared to a decay count threshold. If the threshold is exceeded then the mobile speed state as well as the last speed state is also set to the special symbol. It should also be indicated that processing at step 632 is also performed if the number of valid stationary windows does not exceed the stationary threshold, but the local mobility speed state is set equal to one as determined by decision step 626.

Figure 14:
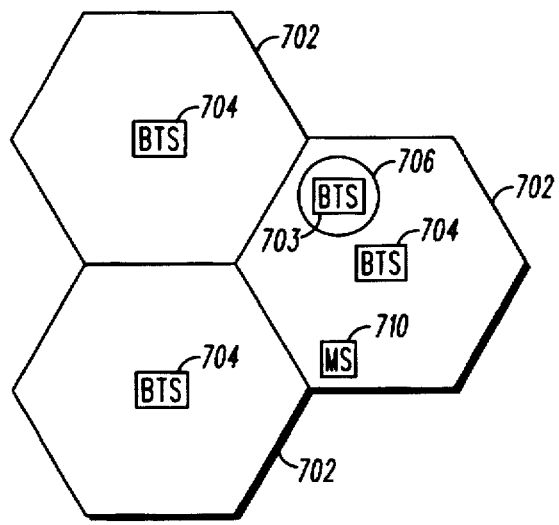
FIG. 14 is a diagram depicting a plurality of base stations supporting an arrangement of the microcells and macrocells in a wireless communications system.

Referring to FIG. 14, a particular embodiment of the wireless communication system 20 serves a geographic area that is divided into a plurality of macrocells 702, each containing a BTS 704. In areas of high wireless communications traffic density, a plurality of BTS's 703 with smaller coverage areas, or microcells 706 are placed within the coverage area of at least one of the macrocells 702. A plurality of mobile subscribers 710 use the resources of the wireless communications system 20.

Figure 15:
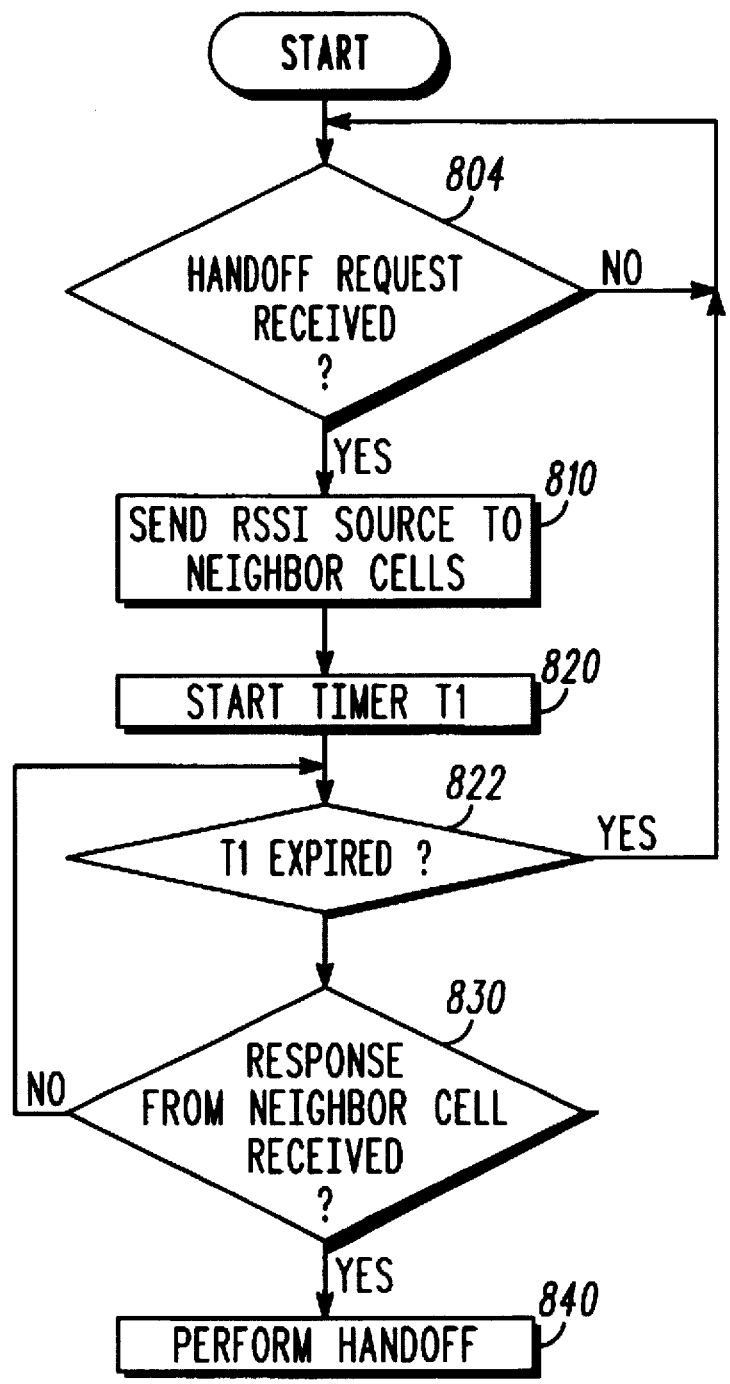
FIGS. 15–17 are flow charts illustrating a preferred embodiment of a handoff control process using speed measurements.

Referring to FIG. 15 the handoff determination process begins when the mobile subscriber is in a communication session with the wireless communications system 20. During the communications session the MSC 22 is in a state that waits for handoff requests from the serving BTS 704 at 804. The BTS 704 that is currently providing the radio channel resource to the mobile subscriber requests a handoff to the MSC 22 over interface circuits 30 by reporting the current RSSI, at 810, of the mobile subscriber as measured by a receiver at the BTS 704. The MSC 22 then forwards this reading via interface circuits to BTS's 704 that are adjacent to the coverage area of the BTS 704 that is currently providing the radio channel resource, at step 810, starts a timer, at 820. If another BTS 704 determines that it could better serve the mobile subscriber, it indicates this to the MSC, at 830. If no BTS 704 responds that it could better serve the mobile subscriber, the MSC 22 then manages the handoff from one BTS 704 to another BTS, at step 840.

In a particular embodiment, the BTS 24 requesting handoff to the MSC 22 uses the mobility index 118 to determine how often to make a handoff request. Once the mobile subscriber 710 is in a communications session with the wireless communications system 20, several counters are reset. Periodically, the scan receiver 28 makes an RSSI measurement for the mobile subscriber 710. This RSSI reading is compared to a handoff threshold. If the RSSI reading is below the handoff threshold, a handoff threshold count is incremented. If the RSSI level is above the handoff threshold and the handoff threshold count >0, the handoff threshold count is cleared. A timer is started to delay the next scan receiver measurement.

If the handoff threshold count is equal to a predetermined number of readings for handoff request, a threshold met indicator is incremented. The current mobility state 118 determines the threshold met indicator value needed to request handoff to the MSC 22 defined as a mobility handoff threshold. In general, the slower the speed of the mobile unit 710 the larger the mobility handoff threshold. If the mobility state 118 is indeterminate, the system 20 treats this as a fast moving subscriber. If threshold met indicator is less than the mobility handoff threshold, the process restarts a timer to delay the next scan receive measurement from scan receiver 28 and resets the handoff threshold count. If the threshold met indicator is greater than or equal to the mobility handoff threshold, handoff is requested and the threshold met indicator is reset.

Figure 16:
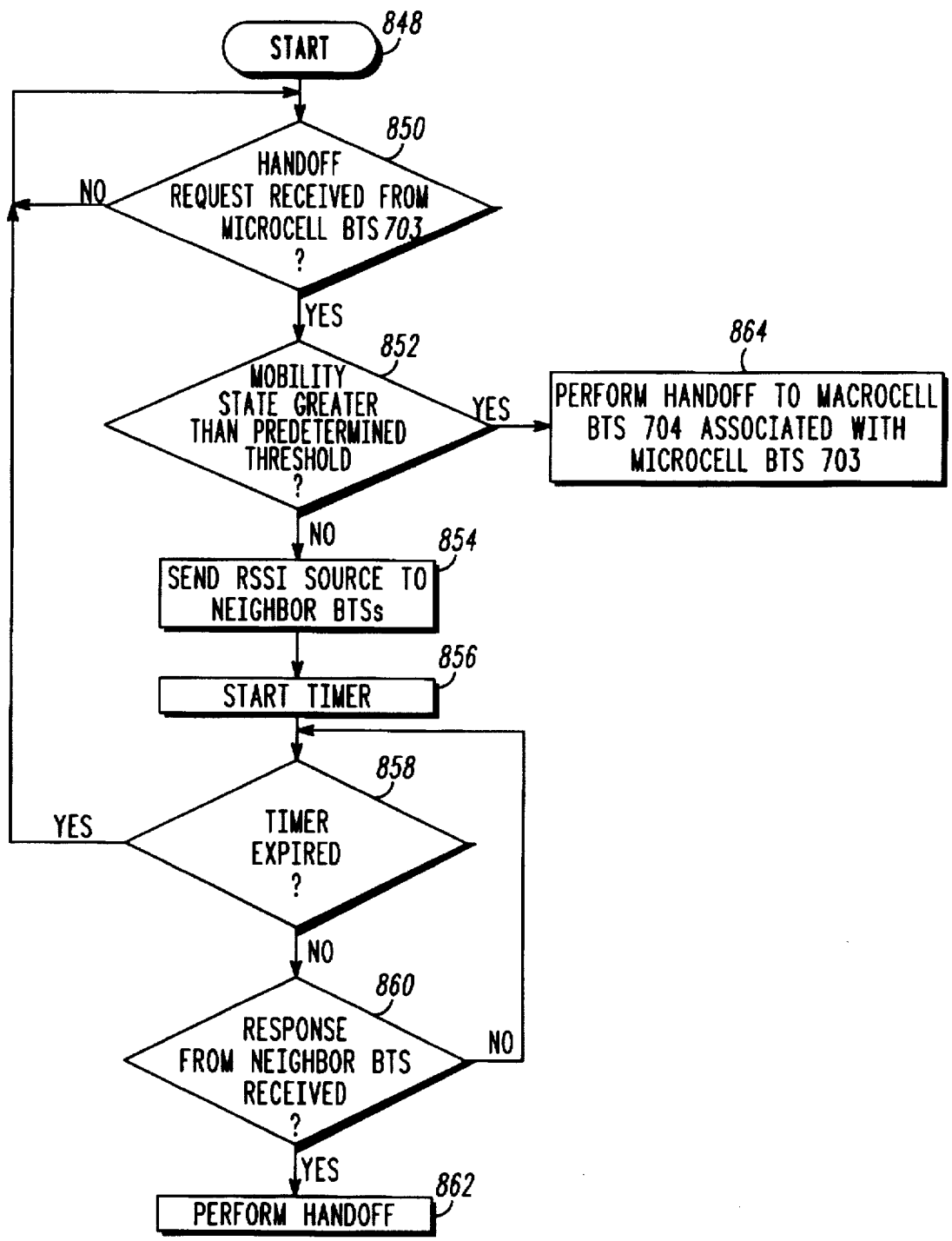

FIG. 16 describes the process of using speed detection to execute microcell to macrocell handoff used by MSC 22. A mobile subscriber is in a communications session with a BTS 703. BTS 703 sends handoff requests to the MSC 22. Handoff requests include an indication of the speed of the mobile. At 852, the MSC 22 compares the speed state to a predetermined threshold. If the speed state indicates a speed greater than the predetermined threshold, the MSC 22 then initiates a handoff to a BTS 704, at 864, that is designated as a macrocell that serves the same geographic area as the microcell. This handoff is preferably executed based on mobile speed instead of using RSSI level measurements. By handing off from a microcell to a macrocell, the system 20 reduces the number of dropped calls.

Figure 17:
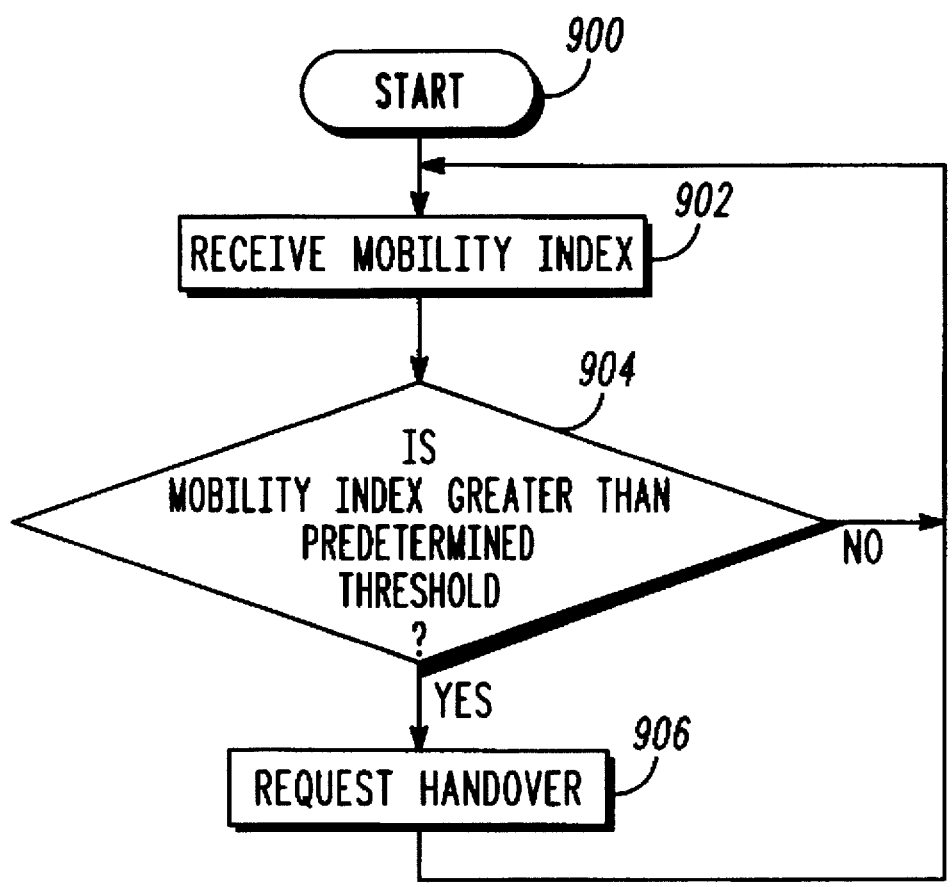

FIG. 17 describes the process of requesting a handover for a fast moving mobile. The process is executed by processor 114 which is a part of XCVR 26 which is part of BTS 703. At step 902 processor 114 receives a mobility index from signal processor 112. At decision step 904 the mobility index is compared to a predetermined threshold. If the mobility index indicates a speed greater than the predetermined threshold, then a handoff request is sent to MSC 22 at 906 and processing continues at 902. If the speed is not greater than the predetermined threshold, then processing continues at 902.

The preferred method and apparatus has many benefits. For example, the use of different sample window lengths and sample rates over which fades are counted allows low speeds to be detected accurately by the low speed detector with a longer window length and high speeds to be detected accurately by the high speed detector with a shorter window length. The use of a fade depth threshold and a SSI qualification threshold to invalidate a window of samples from a speed calculation allows accurate and reliable determination of speed in mobile environments that vary due to interference, noise, dominant line-of-sight (Rician) signal conditions, and weak-signal conditions. By averaging the speed over a history of many samples windows and requiring a number of windows to be valid before indicating a speed, an accurate speed can be determined. By invalidating sample windows based upon a loss of supervision or during mobile power changes it is possible to discard sample windows that might cause an invalid speed to be determined which results in a more accurate speed measurement. As an another example, link traffic between BTS 24 and MSC 22 and processor loading at the MSC 22 is reduced when the handoff request rate is reduced in response to low speed measurements.

Further advantages and modifications of the above described apparatus and method will readily occur to those skilled in the art. The invention, in its broader aspects, is therefore not limited to the specific details, representative apparatus, and illustrative examples shown and described above. Various modifications and variations can be made to the above specification without departing from the scope or spirit of the present invention, and it is intended that the present invention cover all such modifications and variations provided they come within the scope of the following claims and their equivalents.

What is claimed is:

1. A method of measuring speed of a mobile unit in communication with a wireless communication system, the wireless communication system comprising a switch and a base station in communication with the switch, the method comprising the steps of:

receiving a radio frequency, RF, signal from the mobile unit;

measuring signal quality of the RF signal during a first time period to produce a first group of samples;

sampling the received quality signal during a first time period and at a first sampling rate to produce a first group of samples;

sampling a received quality signal during a second time period and at a second sampling rate to produce a second group of samples;

calculating a variation in signal quality of the RF signal in response to the first and second group of samples;

determining a speed measurement in response to the variation in signal quality; and the base station directing to the switch a plurality of handoff requests at a timing rate, the timing rate adjusted based on the speed measurement.

2. The method of claim 1, wherein the variation in signal quality is calculated based on a difference of a quality measurement for a minimum and a maximum sample in the first group of samples.

3. The method of claim 1, wherein the variation in signal quality comprises a fade depth measurement and further comprising the step of comparing the fade depth measurement to a threshold.

4. The method of claim 1, further comprising associating the mobile unit with a mobility index based on the speed measurement.

5. The method of claim 4, further comprising storing the mobility index in a memory.

6. The method of claim 4, wherein the mobility index comprises one of an indeterminate state and a speed indication.

7. The method of claim 6, wherein the speed indication comprises a speed level selected from a plurality of speed levels, each speed level identifying a range of speed values.

8. The method of claim 7, wherein one of the plurality of speed levels identifies a stationary mobile unit.

9. The method of claim 1, wherein the timing rate is adjusted based on mobility index of the mobile unit.

10. The method of claim 1, wherein the timing rate comprises a substantially periodic timing rate.

11. The method of claim 1, further comprising changing a mobility index based on detecting a loss of communication between the mobile unit and the wireless communication system.

12. The method of claim 11, wherein the loss of communication is detected by comparing a measured supervisory audio tone with a threshold.

13. The method of claim 12, wherein the loss of communication is detected by detecting a transition from a digital supervisory audio tone, DSAT, to a digital signaling tone DST within the RF signal received from the mobile unit.

14. The method of claim 4, wherein the mobility index is adjusted based on a change in transmit power level of the mobile unit.

15. A receiver in a wireless communication system comprising:

an antenna receiving a radio frequency signal;

a radio frequency stage receiving the radio frequency signal and producing a measured quality signal;

a processor responsive to the radio frequency stage, the processor including a memory having a speed measurement routine;

a handoff controller responsive to said processor;

said processor when executing said speed measurement routine:

sampling the measured quality signal at a first sampling rate to produce a first group of samples;

sampling the measured quality signal at a second sampling rate to produce a second group of samples;

calculating an average fade depth of the first and second group of samples;

determining a speed measurement based on the average fade depth of the first and second group of samples; and said handoff controller initiating handoff requests based on the speed measurement.

16. A wireless communication system comprising:

a base station including a receiver comprising:

an antenna receiving a radio frequency signal;

a radio frequency stage receiving the radio frequency signal and producing a measured quality signal;

a processor responsive to the radio frequency stage, the processor including a memory having a speed measurement routine;

said processor when executing said speed measurement routine:

sampling the measured quality signal at a first sampling rate to produce a first group of samples;

sampling the measured quality signal at a second sampling rate to produce a second group of samples;

calculating an average fade depth of the first and second group of samples; and determining a speed measurement based on the average fade depth of the first and second group of samples; and a switching device responsive to the base station, the base station directing to the switching device a plurality of handoff requests at a timing rate, the timing rate adjusted based on the speed measurement.

* * * * *